United States Patent
Barden

[19]

[11] Patent Number: 6,042,295
[45] Date of Patent: Mar. 28, 2000

[54] ROTATING BUSHING FOR A PIN ASSEMBLY

[75] Inventor: William M. Barden, Raleigh, N.C.

[73] Assignee: Caterpillar Inc., Peoria, Ill.

[21] Appl. No.: 09/110,234

[22] Filed: Jul. 6, 1998

[51] Int. Cl.[7] .................................................. F16C 11/00
[52] U.S. Cl. .......................... 403/158; 403/150; 37/468; 414/723
[58] Field of Search .................................. 403/150, 154, 403/157, 158, 161, 162, 37, 38, 39; 37/468; 414/723

[56] References Cited

U.S. PATENT DOCUMENTS

| | | | |
|---|---|---|---|
| 1,991,491 | 2/1935 | Calkins et al. | 308/120 |
| 1,995,548 | 3/1935 | Mermigis | 308/240 |
| 2,712,478 | 7/1955 | Carroll | 308/107 |
| 2,830,823 | 4/1958 | Becker | 279/110 |
| 3,179,476 | 4/1965 | Hurwitt | 308/36.1 |
| 3,336,089 | 8/1967 | Krickler | 305/11 |
| 3,379,464 | 4/1968 | Bradshaw | 403/39 |
| 3,492,054 | 1/1970 | Boggs et al. | 305/11 |
| 3,819,242 | 6/1974 | Robinson | 308/36.1 |
| 3,843,216 | 10/1974 | Campbell | 308/36.1 |
| 4,096,957 | 6/1978 | Iverson et al. | 214/145 R |
| 4,120,537 | 10/1978 | Roley et al. | 305/14 |
| 4,191,431 | 3/1980 | Roley et al. | 305/18 |
| 4,210,405 | 7/1980 | Jesswein | 403/158 |
| 4,251,182 | 2/1981 | Schroeder | 414/723 |
| 4,398,862 | 8/1983 | Schroeder | 414/723 |
| 4,400,898 | 8/1983 | Christensen et al. | 403/158 X |
| 4,607,977 | 8/1986 | Varnelis et al. | 403/154 |
| 4,961,667 | 10/1990 | Reinsma et al. | 403/158 X |
| 5,044,812 | 9/1991 | Ardelt et al. | 403/154 |
| 5,407,235 | 4/1995 | Rechenberg | 384/130 |
| 5,509,737 | 4/1996 | Waskiewicz et al. | 384/138 |
| 5,581,917 | 12/1996 | Barden | 414/723 |
| 5,630,673 | 5/1997 | Krzywanos et al. | 403/158 |

FOREIGN PATENT DOCUMENTS

| | | | |
|---|---|---|---|
| 60679 | 8/1913 | Germany | 403/157 |

*Primary Examiner*—Harry C. Kim
*Attorney, Agent, or Firm*—Diana L. Charlton

[57] ABSTRACT

The present invention is a pin assembly used with a quick coupling device for attaching a work implement to a machine. The pin assembly has a pair of pins each circumferentially surrounded by a bushing which has a pair of seals therein. The seals are positioned between the inner surface of the bushing and an outer surface of the pins for retention of lubricating fluid across a portion of the pins during operation to limit pin wear.

10 Claims, 2 Drawing Sheets

Fig. - 1 -
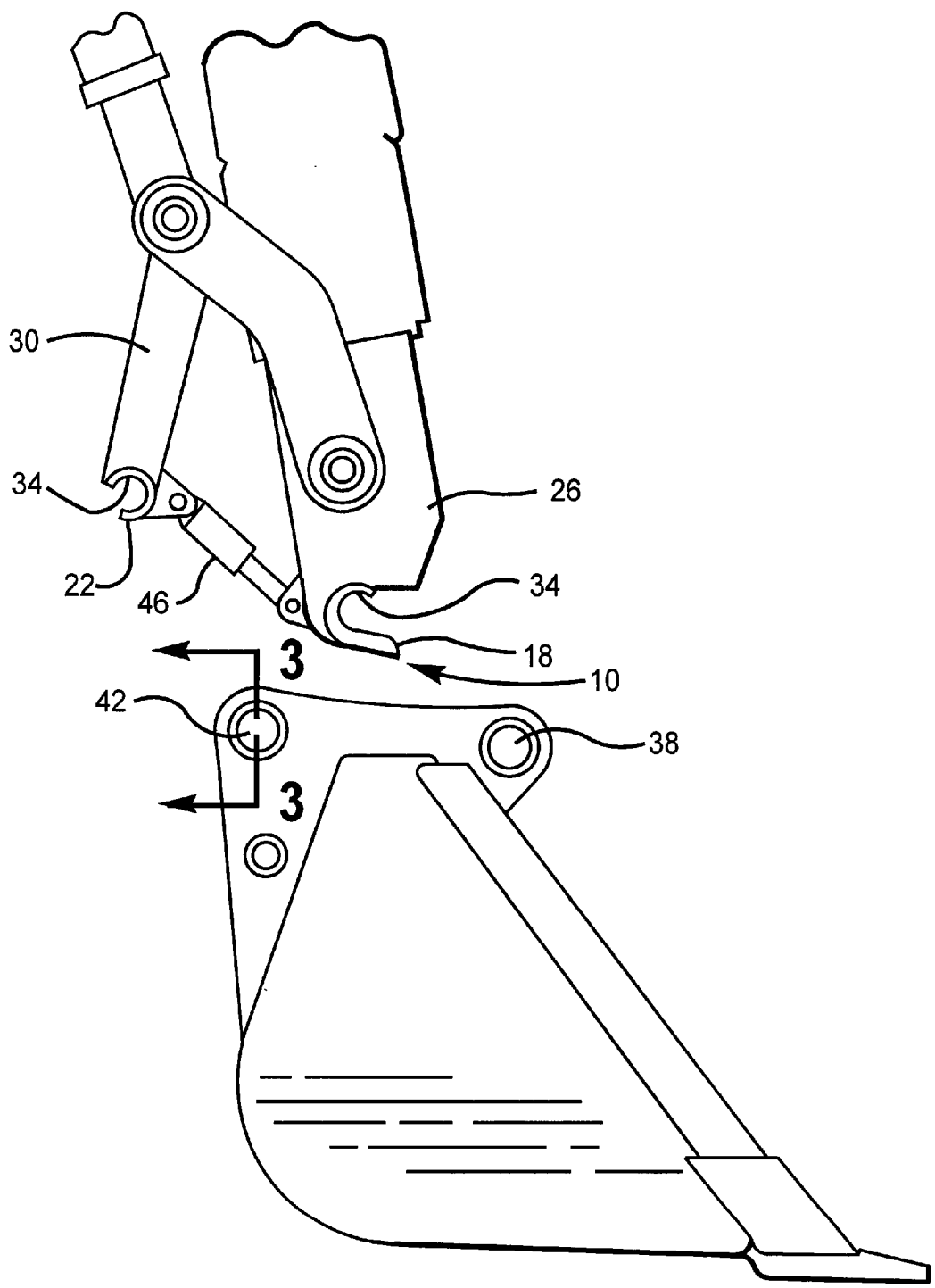

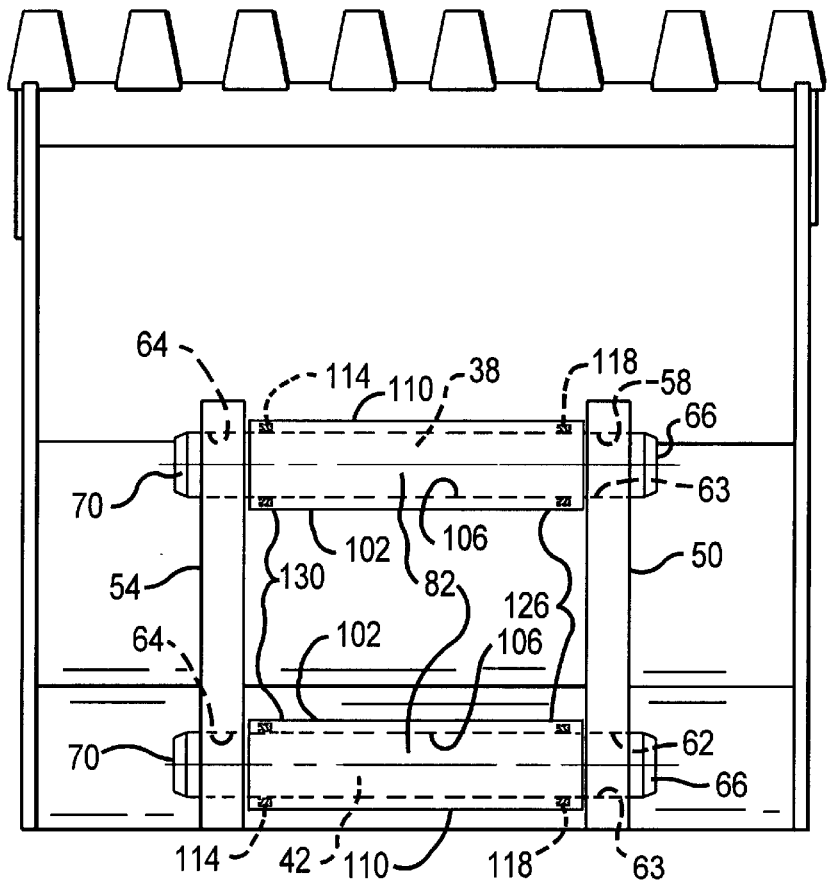
Fig. - 2 -
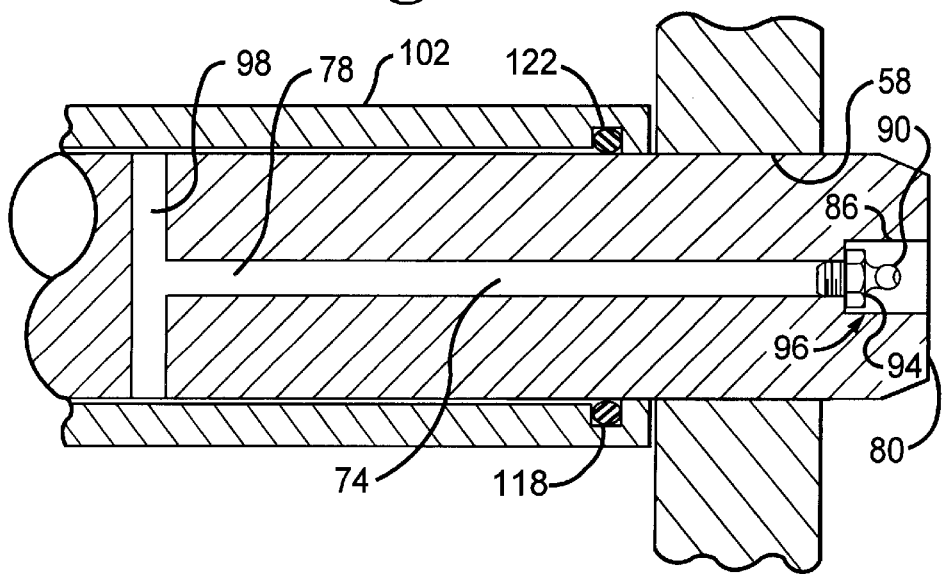
Fig. - 3 -

ROTATING BUSHING FOR A PIN ASSEMBLY

TECHNICAL FIELD

This invention relates generally to a pin assembly for connecting a work implement to a machine and more particularly to a bushing circumferentially surrounding a pin of the pin assembly for lubricating the pin during operational rotation.

BACKGROUND ART

Manual or hydraulic couplers may be used to release and attach various work implements or tools to a work machine, such as wheel loader, during normal daily operation. Generally, a pin assembly is incorporated on the work implement for this attachment process. Not only are these pin assemblies exposed to a hostile environment due to the nature of the materials being handled, they also experience forces during operation which may cause rotation. The rotation of the pin assembly may cause wearing of associated pins at the work implement or coupler connection. Therefore, means for reducing the wear of the pins is important in the proper functioning of the pin assembly.

Various methods of reducing the wear of pin assemblies have been utilized which may include lubricating the pin during operation. One such design is disclosed in U.S. Pat. No. 4,398,862 issued to William L. Schroeder on Aug. 16, 1983. This design, which incorporates the attachment of a work implement to a machine without a coupler, utilizes non-rotational bearings which are press fit into a bore of a boom arm of the machine. The bearings within the bore of the boom arm circumferentially surround an associated pin for connecting the work implement to the machine. The pin assembly is lubricated via a bore extending through the pin which is connected to an internal reservoir. The lubricating fluid is retained within the design through a pair of seals located on the boom arm and a seal between the pin and a thrust collar. The design and assembly of the components can become complicated due, in part, to close manufacturing tolerances between the bearing and the pin. Additionally, the removal of the bearings for maintenance purposes may be time consuming and costly. Furthermore, the location of the seals separate from the pin assembly and bearing interface limits the ability to utilize a typical coupler in conjunction with the design since leakage may occur thereatound. The inability to utilize a coupler limits the flexiblity of the overall design.

The present invention is directed to overcoming the problems as set forth above.

DISCLOSURE OF THE INVENTION

In one aspect of the present invention, a pin assembly is disclosed for a work implement which has a pair of spaced ears defining a pair of axially aligned openings therethrough. The pin assembly includes a first pin which has first and second end portions disposed within one of the respective pair of axially aligned openings. The first pin extends between the spaced ears and has a fluid communication path therein. A second pin is spaced from the first pin and has first and second end portions disposed within the other one of the respective pair of axially aligned openings. The second pin extends between the spaced ears and has a fluid communication path therein. Means is provided for supplying lubricating fluid to the fluid communication path in the first and second pins. A bushing circumferentially surrounds the first and second pins at an outer surface thereof and extending a predetermined distance thereacross. Each of the bushings has an inner surface in fluid communication with the respective fluid communication path within the first and second pins. A pair of seals is substantially disposed within first and second end portions of each of the bushings for sealing between the first and second pin and the respective bushing and for retaining the fluid along a portion of the inner surface of the bushings and the outer surface of the first and second pins between the pair of seals.

In another aspect of the present invention, a pin assembly is disclosed for connecting a quick coupling device to a work implement. The pin assembly includes first and second spaced supporting pins attached to the work implement. The first and second pins have a fluid communication path therein. Means is provided for supplying lubricating fluid to the fluid communication path in the first and second pins. A bushing circumferentially surrounds the first and second supporting pins at an outer surface thereof and extends a predetermined distance thereacross. Each of the bushings has an inner surface in fluid communication with the respective fluid communication path in the first and second pins. A pair of seals is substantially disposed within first and second end portions of each of the bushings for sealing between the first and second pin and the respective bushing and for retaining the fluid along a portion of the inner surface of the bushings and the outer surface of the first and second pins between the pair of seals. Means operatively associated with the quick coupling device is disclosed for connecting the quick coupling device to each of the bushings.

The present invention includes utilizing a pin assembly with a pin circumferentially surrounded by a bushing which has a pair of seals therein for retaining lubricating fluid along a portion of the pin to limit pin wear. The bushing is easily manufactured and disposed on the pin. The placement of the seals between the inner surface of the bushing and outer surface of the pin allows for retention of lubricating fluid across a portion of the pin during operation. Additionally, the design may be easily utilized with a quick coupling device for attaching a work implement to a machine.

BRIEF DESCRIPTION OF THE DRAWINGS

FIG. 1 is a partial diagrammatic side view of a quick coupling device for attaching a bucket to a machine utilizing a pin assembly of the present invention;

FIG. 2 is a partial diagrammatic top view of the present invention pin assembly in incorporation with the work implement; and FIG. 3 is an partial diagrammatic sectional view taken along line 3—3 of FIG. 1 for the present invention pin assembly.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that particular form disclosed, but on the contrary, the intention is to cover all modifications, equivalents, and alternatives falling within the spirit and scope of the invention as defined by the appended claims.

Referring to the drawings, it can be seen that a quick coupling device 10 for use on a work machine (not shown) is disclosed which couples a work implement or tool 14 to the work machine (not shown). It should be understood that although the work implement 14 shown in FIGS. 1 and 2 is a bucket commonly used in conjunction with a wheel loader that any one of a number of different tools may be used.

The quick coupling device 10 includes first and second hook arrangements 18,22 connected to an arm 26 and tilt link 30 of the work machine (not shown). Each hook arrangement 18,22 defines a recess 34 which engages a pin assembly 36 with spaced supporting pins 38,42 connected to the work implement 14. An adjustable link 46 is connected between the first and second hook arrangements 18,22 and is adapted to apply a force to the hook arrangements 18,22 to maintain engagement between the supporting pins 38,42 and the recesses 34. The work implement 14 has a pair of spaced ears 50,54 which are parallely affixed to and positioned on the work implement 14 and span a predetermined distance substantially equal to the width of the hook arrangements 18,22 of the quick coupling device 10. The ears 50,54 are provided with a pair of axially aligned openings 58 and 62, respectively, consisting of first and second apertures 63,64 in each of the ears 50,54.

The supporting pins 38,42 have first and second end portions 66,70 which are disposed within the first and second apertures 63,64 of a respective one of the pair of openings 58,62. Each of the supporting pins 38,42 extend between the pair of ears 50,54 and have a fluid communication path 74 therein. The fluid communication path 74 includes a longitudinal bore 78 which extends a predetermined distance from an outer surface 80 of the supporting pins 38,42 at the first end portion 66. The longitudinal bore 78 terminates at a central location 82 within the supporting pins 38,42 and includes a counterbore 86. A recessed grease zerk 90 is threadably disposed within the longitudinal bore 78 and has a head portion 94 seated against the counterbore 86. The grease zerk 90 in combination with an external lubricating fluid source (not shown) provides a means 96 for supplying lubricating fluid to the fluid communication path 74 in the supporting pins 38,42. A traverse bore 98 extends through the respective supporting pin 38,42 and intersects the longitudinal bore 78 at a substantially perpendicular angle.

A bushing 102 is slidably disposed on each of the supporting pins 38,42 to circumferentially surround the pins 38,42 substantially across the span between the ears 50,54 of the work implement 14. The bushings 102 each have an inner and outer surface 106,110. A pair of spaced seals 114,118 are disposed within a groove 122 at the inner surface 106 of the bushings 102 at respective first and second end portions 126,130 thereof for sealing between the supporting pins 38,42 and the respective bushings 102. A portion of the inner surface 106 of the bushings 103 is fluidly connected to a portion of the outer surface 80 of the supporting pins 38,42 through the respective fluid communication path 74. The traverse bore 98 of the fluid communication path 74 of the supporting pins 38,42 is located between the pair of seals 114,118 for retaining the fluid along the portion of the inner surface 106 of the bushings 102 and the outer surface 80 of the supporting pins 38,42 within the space between the pair of seals 114,118.

Industrial Applicability

During coupling, the hook arrangements 18,22 of the quick coupling device 10 are forced against the bushings 102 in a manner which allows relative movement between the bushings 102 and the supporting pins 38,42. During operation, the supporting pins 38,42 may experience loading which cause the pins 38,42 to rotate. The retention of fluid across a portion of the outer surface 80 of the supporting pins 38,42 brought about by the seals 114,118 within the bushings 102 reduces the friction at the pin 38,42 and bushing 102 interface. The reduction of friction reduces wear of the supporting pins 38,42 and, thereby, prolongs the life of the pins 38,42. Additionally, the seals 114,118 substantially isolate a portion of the supporting pins 38,42 from dirt and debris. Furthermore, the bushings 102 are easily manufactured and can be readily assembled to and from the supporting pins 38,42 by sliding the bushings 102 into and out of place. The location of the seals 114,118 at the interface between the bushings 102 and the supporting pins 38,42 provides a improved design for incorporation with the quick coupling device 10.

Other aspects, objects and advantages of this invention can be obtained from a study of the drawings, disclosure and the appended claims.

I claim:

1. A pin assembly for a work implement having a pair of spaced ears defining a pair of axially aligned openings therethrough, comprising:

a first pin having first and second end portions disposable within one of the respective pair of axially aligned openings and extendable between the spaced ears, the first pin having a fluid communication path therein;

a second pin spaced from the first pin and first and second end portions disposable within the other one of the respective pair of axially aligned openings, the second pin extendable between the spaced ears and having a fluid communication path therein;

means for supplying lubricating fluid to the fluid communication path in the first and second pins;

a bushing circumferentially surrounding each of the respective first and second pins at an outer surface thereof and extending a predetermined distance thereacross, each of the bushings having an inner surface in fluid communication with the respective fluid communication path within the first and second pins; and a pair of seals substantially disposed within first and second end portions of each of the bushings in contact with the inner surface of the bushings and the outer surface of the first and second pins to provide a seal therebetween, the pair of seals retaining the fluid along a portion of the inner surface of the bushings and the outer surface of the first and second pins between the pair of seals.

2. The pin assembly of claim 1, wherein the bushings are adapted to substantially extend the entire width between the spaced ears of the work implement.

3. The pin assembly of claim 1, wherein the means for supplying fluid includes a grease zerk disposed within the fluid communication path in the first and second pins.

4. The pin assembly of claim 3, wherein the fluid communication path in the first and second pins includes a first bore extending a predetermined distance from the outer surface at the first end portion and terminating therein and a second bore extending through the respective pin and intersecting with the first bore.

5. The pin assembly of claim 4, wherein the second bore is substantially perpendicular to the first bore and is located at a central portion between the respective pair of seals of the bushings.

6. A pin assembly in combination with a quick coupling device and a work implement, comprising:

first and second spaced supporting pins attached to the work implement, the first and second pins having a fluid communication path therein;

means for supplying lubricating fluid to the fluid communication path in the first and second pins;

a bushing circumferentially surrounding each of the respective first and second supporting pins at an outer surface thereof and extending a predetermined distance thereacross, each of the bushings having an inner surface in fluid communication with the respective fluid communication path in the first and second pins;

a pair of seals substantially disposed within first and second end portions of each of the bushings in contact with the inner surface of the bushings and the outer surface of the first and second pins to provide a seal therebetween, the pair of seals retaining the fluid along a portion of the inner surface of the bushings and the outer surface of the first and second pins between the pair of seals; and means operatively associated with the quick coupling device for connecting the quick coupling device to each of the bushings.

7. The combination of claim 6, wherein the bushings substantially extend the entire width between the spaced ears of the work implement.

8. The combination of claim 6, wherein the means for supplying fluid includes a grease zerk disposed within the fluid communication path in the first and second pins.

9. The combination of claim 8, wherein the fluid communication path in the first and second pins includes a first bore extending a predetermined distance from the outer surface at the first end portion and terminating therein and a second bore extending through the respective pin and intersecting with the first bore.

10. The combination of claim 9, wherein the second bore is substantially perpendicular to the first bore and is located at a central portion between the respective pair of seals of the bushings.

* * * * *